(12) United States Patent
Basse

(10) Patent No.: US 6,561,344 B1
(45) Date of Patent: May 13, 2003

(54) BELT, ESPECIALLY CONVEYER BELT AND METHOD FOR MANUFACTURING SAME

(75) Inventor: Hartwig Basse, Nordenham (DE)

(73) Assignee: Norddeutsche Seekabelwerke GmbH & Co. KG, Nordenham (DE)

( * ) Notice: Subject to any disclaimer, the term of this patent is extended or adjusted under 35 U.S.C. 154(b) by 0 days.

(21) Appl. No.: 09/597,793

(22) Filed: Jun. 20, 2000

(30) Foreign Application Priority Data

Jun. 22, 1999 (DE) .......................... 199 28 389

(51) Int. Cl.[7] .................. B65G 15/30; B65G 15/42; B65G 15/62
(52) U.S. Cl. ................. 198/844.1; 198/846; 198/847; 198/840
(58) Field of Search .................. 198/844.1, 840, 198/841, 845, 846, 847

(56) References Cited

U.S. PATENT DOCUMENTS

| | | | | | |
|---|---|---|---|---|---|
| 3,310,161 | A | * | 3/1967 | Kraft, Jr. ................ | 198/847 |
| 4,164,440 | A | * | 8/1979 | Previati ................. | 156/583.1 |
| 4,190,185 | A | * | 2/1980 | Thate .................... | 226/172 |
| 4,369,612 | A | * | 1/1983 | Wight ................... | 53/494 |
| 4,420,299 | A | * | 12/1983 | De Mets ................. | 425/101 |
| 4,533,040 | A | * | 8/1985 | Howerton ................ | 198/847 |
| 4,615,434 | A | * | 10/1986 | Lachmann ............... | 198/845 |
| 4,684,794 | A | * | 8/1987 | Holland-Letz ........... | 235/449 |
| 4,848,539 | A | * | 7/1989 | Allwein ................. | 198/804 |
| 4,997,507 | A | * | 3/1991 | Meyer ................... | 156/286 |
| 5,316,132 | A | * | 5/1994 | Muraoka et al. ......... | 198/847 |
| 5,620,084 | A | * | 4/1997 | Mensch .................. | 198/845 |
| 5,911,307 | A | * | 6/1999 | Kraft et al. ........... | 198/847 |
| 6,012,656 | A | * | 1/2000 | Anderson ................ | 239/672 |
| 6,092,645 | A | * | 7/2000 | Wahren .................. | 198/847 |
| 6,109,427 | A | * | 8/2000 | Hosch et al. ........... | 198/844.1 |
| 6,131,725 | A | * | 10/2000 | Saito et al. ............ | 198/946 |
| 6,135,441 | A | * | 10/2000 | Belec et al. ............ | 271/35 |
| 6,158,573 | A | * | 12/2000 | Janzen .................. | 198/689.1 |
| 6,173,831 | B1 | * | 1/2001 | Grabscheid et al. ..... | 198/844.1 |
| 6,216,853 | B1 | * | 4/2001 | Fujita .................. | 198/847 |

* cited by examiner

*Primary Examiner*—D. Glenn Dayoan
*Assistant Examiner*—Greg Blankenship
(74) *Attorney, Agent, or Firm*—Technoprop Colton LLC

(57) ABSTRACT

Conveyer belts (10) are deflected many times along a conveying path of the objects to be conveyed. It has been shown that unpleasant squeaking noises are generated in the region of this deflection between the guide means (12) of the conveyer belt (10) and guide rollers or guide drums.

The invention is based on the knowledge that the squeaking noises are caused by the relatively high friction value of the material of the conveyer belt (10). The design according to the invention therefore proposes that at least the outer side of the guide means (12) of the conveyer belt (10) is provided with a coating (26) made from a material with a lower frictional value. As a result, it has been shown that undesirable squeaking noices can be effectively avoided.

12 Claims, 4 Drawing Sheets

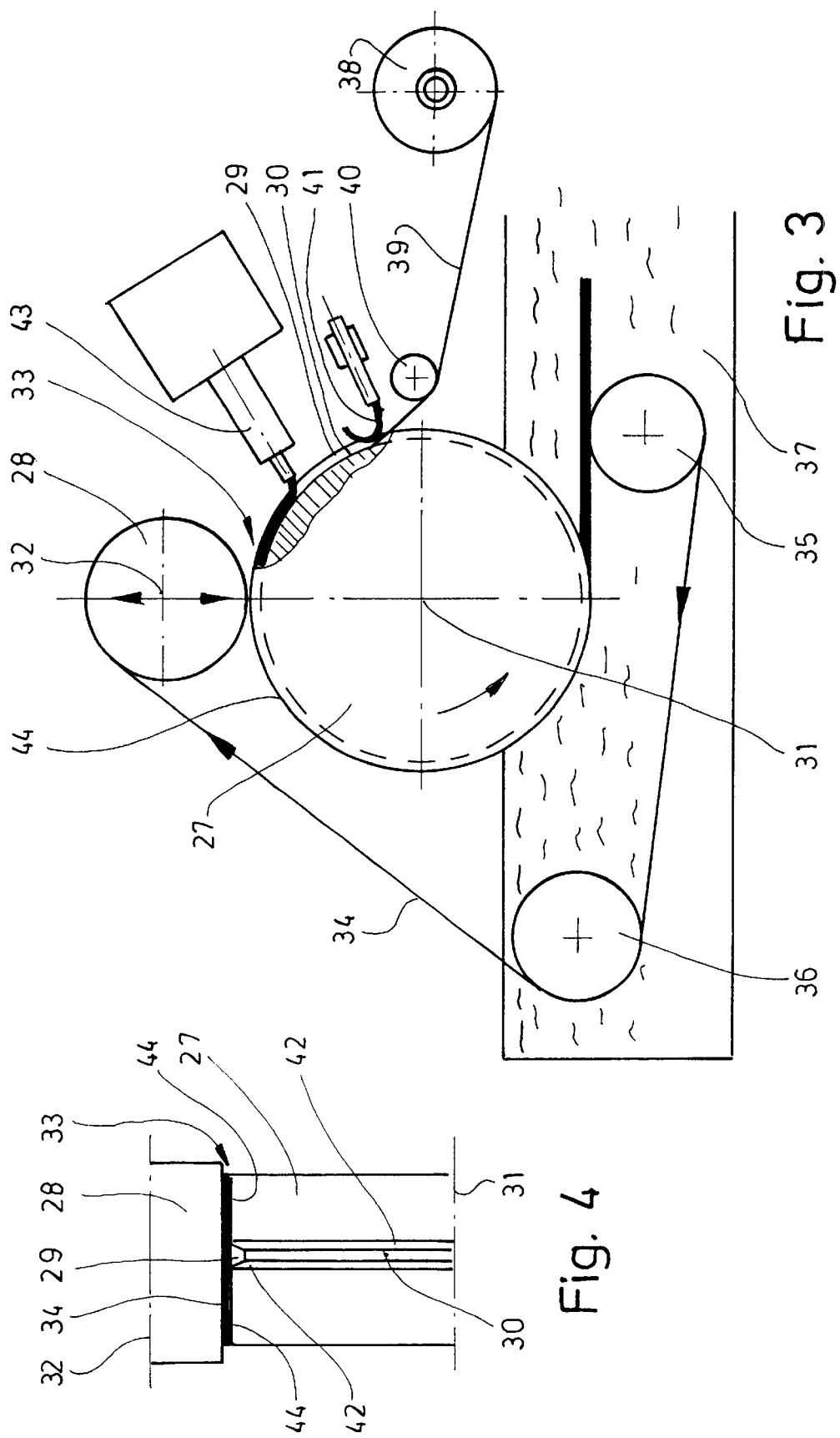

BELT, ESPECIALLY CONVEYER BELT AND METHOD FOR MANUFACTURING SAME

BACKGROUND OF THE INVENTION

The invention relates to a belt, especially a conveyer belt, and a method for manufacturing a belt.

PRIOR ART

Belts usually consist entirely or in large part of an elastic material with a proportionately high friction value (coefficient of friction). The high friction value is necessary in order to be able to transmit the greatest possible driving forces with the belt. Belts which are employed for conveying or transporting purposes, namely conveyer belts, are deflected along the conveying path by usually a rather large number of rollers or drums, thus being led around curves in the conveying plane. It has been established that disturbing noises arise in the regions where such a belt is deflected.

The objective of the invention is therefore to create a belt, especially a conveyer belt, which results in a lower level of noise being generated.

BRIEF SUMMARY OF THE INVENTION

A belt which fulfills this objective has the features of claim 1. Accordingly, the outer side of the belt is provided at least partially with a reduced friction value. This embodiment of the belt according to the invention is based on the knowledge that the high friction value at the outer side of the material used in conventional belts causes relatively high-pitched and often disturbing noises when the belt is deflected. A solution to the objective on which the invention is based can be sufficiently achieved by providing a reduced friction value only to those outer surfaces of the belt which come into contact with the rollers or drums used to deflect the belt. Thus only part of the belt must be provided with a reduced friction value.

For a belt comprising a load-carrying traction means and at least one guidance means for directing the conveyer belt on the transport path, it is expedient to have only the guide means provided with a reduced friction value at least on part of its outer surface. This proves sufficient for reducing the generation of noise by the conveyer belt because the deflection of the conveyer belt along the conveying path occurs via a single or, if required, a plurality of guide means of the conveyer belt, with most of the disturbing noise being generated by this deflection. The traction means of the belt then requires no modification at all.

According to a preferred embodiment of the invention, a reduction of the friction value is achieved by an outer coating of at least one part of the belt using a material exhibiting a smaller friction value. This material is preferably made of a corresponding thermoplastic synthetic, such as polyamide, polypropylene or polytetrafluor ethylene. In contrast, the remaining material (core material) of the belt—apart from its reinforcement plies—are made of elastic material, specifically rubber or an elastomer, in particular polyester elastomer or polyurethane, which has a greater friction value. The friction value of the core material can be up to twice as great as that of the coating material, in particular it is 20% to 50% greater.

The coating preferably takes place by means of a synthetic web applied externally to at least one part of the core material of the belt. This type of coating can be applied easily, ensuring a permanent bond with the core material of the belt. However, it is also conceivable to spray, flock coat or extrude the coating of synthetic material with a lower friction value onto the core material with a greater friction value.

According to a further development of the belt, a profile is to be given to at least the guide surfaces of the guide means. This profile can be formed by grooves and/or projections of an arbitrary cross-section. But it is also conceivable to have provided a web-like profile made of strands, in particular, criss-crossing strands. By giving a profile to at least the guide surfaces of the guide means, a reduction of the bearing surfaces on the rollers, drums or the like used to deflect the belt is achieved. In conjunction with the coating of reduced friction value, which in particular also extends across the region of the projections, grooves and/or strands, this arrangement results in a particularly effective reduction of unpleasant noises.

A method for solving the objective set forth above is disclosed by the measures of claim 17. Accordingly, the coating is first put into a form device for shaping at least one part of the belt, especially the guide means, then the remaining material for the belt, especially the core material, is put into the form device. The core material at least is put into the form device in a softened state so that during the subsequent profile fashioning of the belt with the coating material, the softened core forms a permanent bond. This method of coating the belt requires practically no additional effort. This additional effort is particularly negligible if the coating material is fed to the form device in a cold state. But it is also conceivable to have the coating material warmed.

According to a preferred development of the method, the preferably cold, or not free-flowing, coating material is put into a depression of the form device which corresponds to the shape of the belt of a part thereof, and is pre-shaped therein before the warmed core material for forming the remaining part of the belt or guide means is fed into the form device. Applying pressure to at least one part of the wall of the depression in the form device ensures that the coating is located at the designated position of what is later to become the belt or a part thereof, in particular in the designated regions at the outer side of the belt.

BRIEF DESCRIPTION OF THE DRAWINGS

The preferred exemplary embodiments will be described in more detail below with reference to the drawings. Shown in these are:

FIG. 3 a device for manufacturing a part of the belt in a side view,

FIG. 4 view of the region between the grooved rolls for manufacturing the belt part, FIG. 5 a cross-section through the belt part manufactured by the form device of FIGS. 3 and 4, at a pre-finished stage, FIG. 6 a cross-section through the finished belt part, FIG. 7 an enlarged view of an alternatively-configured belt part in a cross-sectional view analogous to FIG. 6, and FIG. 8 a belt part in a view according to FIG. 7 showing another alternative configuration.

BRIEF DESCRIPTION OF THE PREFERRED EMBODIMENTS

Figure 1:
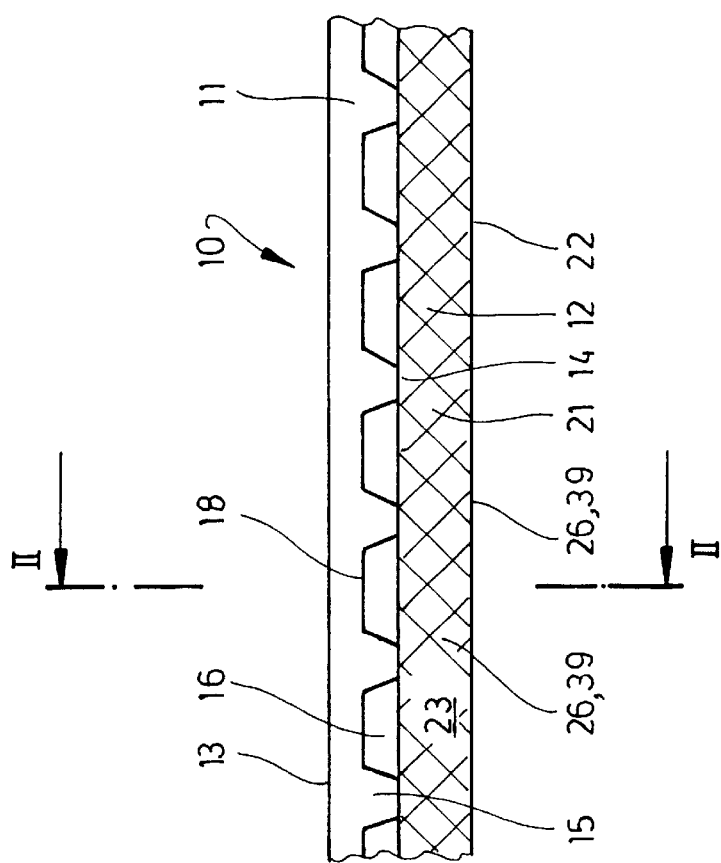
FIG. 1 a side view of a part of a belt.
Figure 2:
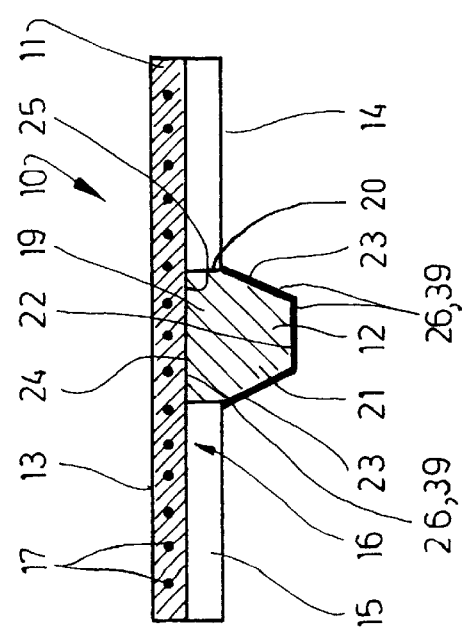
FIG. 2 a cross section II—II through the belt of FIG. 1.

The above figures, in particular FIGS. 1 and 2, show a belt which is more precisely a conveyer belt 10. The conveyer belt 10 shown here comprises a traction means 11 and a guide means 12. The traction means 11 serves mainly to transmit the driving forces of the conveyer belt 10. Objects to be transported can lie directly on a smoother top side 13 of the traction means 11. But generally the conveyer belt 10 is arranged below separate carrying means for receiving the objects to be transported. This may be arranged such that the conveyer belt 10 is frictionally-engaged to the underside of the preferably plate-shaped carrying means, which are not shown in the figures, lying against it with the top side 13 of the traction means 11, or is connected in a force-locking manner to the carrying means for transporting the objects, for example by means of screws or rivets.

The traction means 11 has a toothed-belt profile on its underside 14. In the shown exemplary example, the profile results from the alternate succession of (trapezoid-shaped) protrusions 15 and depressions 16. The successive protrusions 15 and depressions 16 are configured uniformly. In particular, the protrusions 15 are regularly spaced. The protrusions 15 in essence form teeth for the positive-engagement drive of the conveyer belt 10 by means of at least one gearwheel-like driving wheel. An outer surface of such a driving wheel is configured to correspond to the protrusions 15 and depressions 16 of the conveyer belt 10. By virtue of the described design of the underside 14 of the traction means 11, this arrangement is practically one of a synchronous belt.

The traction means 11 shown here is provided with a plurality of traction strands 17 running in the longitudinal direction of the conveyer belt 10. Embedded in the traction means 11 at approximately the same distance to one another, the traction strands 17 are located in that region of the traction means 11 which lies above the depressions 16, specifically approximately centered between the bottom surfaces 18 of the depressions 16 and the top side 13 of the traction means 11.

The conveyer belt 10 shown here is provided with a single guide means 12, which runs in the longitudinal direction of the conveyer belt 10 and is arranged approximately centered below the traction means 11. The guide means 12 has a rectangular-shaped root section 19, whose height corresponds to the teeth of the traction means 11 formed by the protrusions 15 and which is arranged in a correspondingly centered longitudinal groove 20 of the traction means 11. The longitudinal groove 20 proceeds from the underside 14 of the traction means 11 and ends in the plane of the bottom surfaces 18 of the depressions 16. Projecting opposite the underside 14 of the traction means 11 is the guide means 12 with a trapezoid-shaped guide section 21. The height of the guide section 21 corresponds approximately to the thickness of the traction means 11. The trapezoid-shaped guide section tapers down to a free end surface 22, which runs at a parallel distance to the underside 14 of the traction means 11. The mutually opposing guide surfaces 23 of the guide section 21 of the guide means 12 thus run obliquely to the vertical direction, specifically at an acute angle thereto. Both opposing guide surfaces 23 have the same angle to the vertical. The opposing guide surfaces 23 are inclined in opposite directions so that they converge toward the horizontal guide surface 23.

The root section 19 and the guide section 21 of the guide means 12 have one-piece configurations. The guide means 12, arranged in the longitudinal groove 20 in a positive fit, is connected by a horizontal top side 24 of the root section 19 to a base surface 25 of the longitudinal groove 20 in the traction means 11, specifically by adhesion, welding, vulcanization or the like. This connection is made such that the traction means 11 and the guide means 12 for the formation of the conveyer belt 10 are joined to each other permanently and as a single piece.

The traction means 11 and the guide means 12 are essentially made of flexible material having a high friction value (coefficient of friction), specifically rubber or an elastomer, in particular a polyester elastomer or polyurethane. The traction strands 17 in the traction means are formed in commonly known fashion from a high-tensile material, for instance, a cable made of high-tensile fibers or metal wires.

According to the invention a part of the outer side of the conveyor belt 10 exhibits a reduced friction value. To this end, some surfaces of the conveyer belt 10 are provided with a coating of material having a lower friction value.

In the shown exemplary embodiment, one part of the guide means 12 has an outer surface with a reduced friction value. It is these surfaces of the guide means 12 which come into contact with the deflection drums or deflection wheels, which are not shown in the Figures. For the conveyer belt 10 shown in FIGS. 1 and 2, these involve the horizontal end surface 22 and the opposite oblique guide surfaces 23 of the guide section 21 of the guide means 12. There are cases where it is sufficient to have only the exterior of the opposing oblique guide surfaces 23 provided with a lower or reduced friction value, that is, that they are coated.

The reduction of the friction value in the outer sides of the guide means 12, that is, of at least opposing, oblique guide surfaces 23, preferably also of the end surface 22 between the guide surfaces 23, is achieved by coating the corresponding outer sides of the core material of the guide means 12 which has a greater friction value (polyurethane, for example). This coating is preferably made of a synthetic web whose friction value is less than the other material of the conveyer belt 10, in particular the core material of the guide means 12. This is preferably a polyamide web 39. The coating 26, that is to say, the polyamide web 39, is permanently joined to the core material of the guide means 12. This occurs preferably during the manufacture of the guide means 12.

It is also conceivable to have the coating 26 formed by spraying or flock coating the corresponding material having a lower friction value onto the core material of the guide means 12. It may also be possible that an adhesive strip whose outer surface exhibits a reduced friction value can be affixed to the core material of the guide means 12 at the oblique guide surfaces 23 and, if necessary, the end surface 22.

Figure 6:
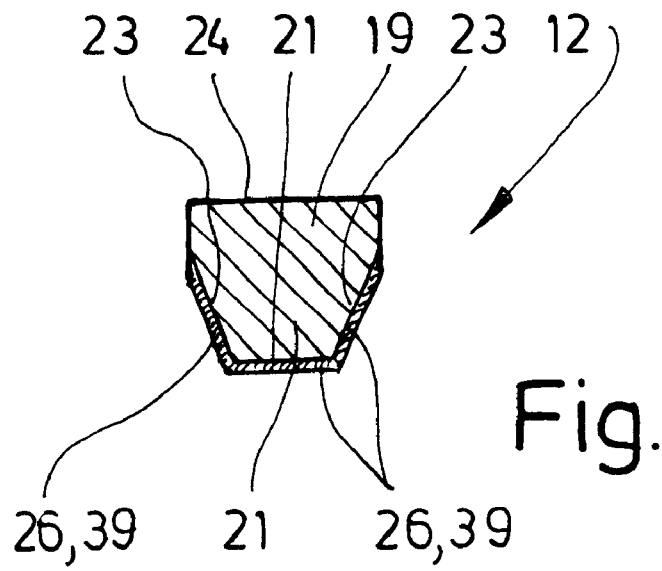
Figure 7:
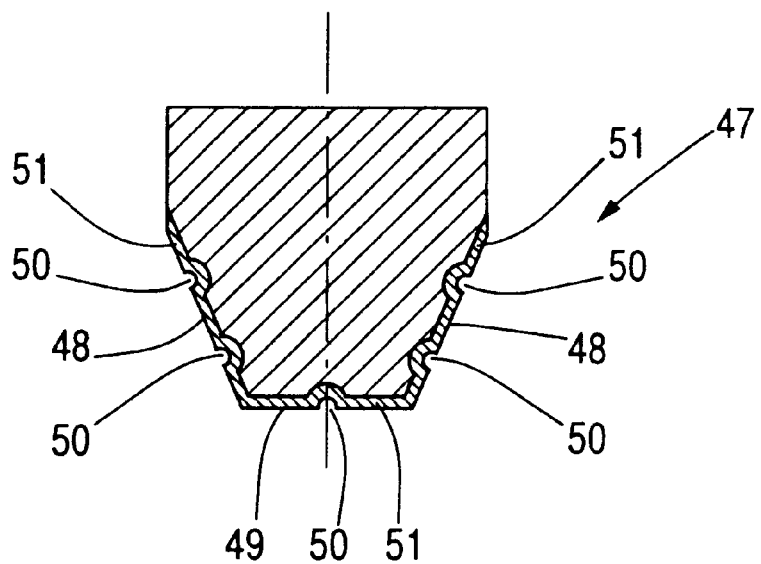

As an alternative to the shown exemplary embodiment, the guide means 12 can also be disposed on a differently configured traction means, such as a flat belt. It is also conceivable for the conveyer belt to have a plurality of, preferably parallel, guide means 12. Finally, the guide means 12 may exhibit different cross-sections. In particular, the guide section 21 of the guide means 12 must not be trapezoid in shape. It can also have a triangular-shaped cross-section or a semi-circular one. Ultimately, for belts which have only one traction means, and thus no guide means 12, the traction means itself can feature a reduced friction value along parts of its outer side by having a part of the traction means coated with an appropriate material FIG. 7 shows an alternate exemplary embodiment of a guide means 47, specifically in an enlarged cross-section compared to that shown for the guide means 12 in FIG. 6. Guide means 47 has a profile in both opposing oblique guide surfaces 48 and in the end surface 49. In the exemplary embodiment shown, the profile is formed by two grooves 50 in each guide surface 48 and a centered groove in the end surface 49. The grooves 50 are identically shaped, thus provided with an approximately semicircular cross-section. The grooves 50 run straight in the longitudinal direction of the guide means 47. The guide means 47 exhibits a continuous coating 51 on the guide surfaces 48 and end surface 49, which is configured like the coating 26 of the guide means 12 in the previously described exemplary embodiment. The coating 51 also extends continuously across the regions of the grooves 50.

The grooves 50 may also exhibit other cross-sections, as shown in the exemplary embodiment of FIG. 7. For example, they may be trapezoidal or triangular in shape. Likewise it is conceivable that the number of grooves in the face of guide surfaces 48 may deviate from the shown exemplary embodiment. The end surface 49 does not necessarily require a groove. The coating 51 may also be lacking at the end surface 49. Furthermore, it is conceivable that the coating 51 does not extend across the region of the grooves 50 and the grooves 50 run oblique to the longitudinal direction of the guide surfaces 48. If necessary, the grooves 50 may also be arranged to run transverse to the longitudinal direction of the guide surfaces 49.

Figure 8:
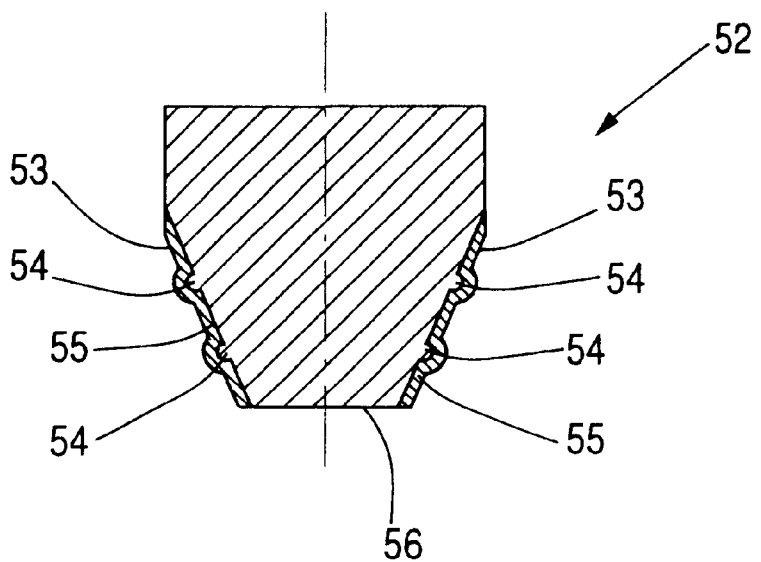

FIG. 8 shows a further exemplary embodiment of a guide means 52. The guide means 52 exhibits projections 54 on its guide surfaces 53. The projections 54 have a cross-section in the shape of a circular sector, in particular of a semicircle. Each guide surface 53 is associated with two projections 54, which run continuously in the longitudinal direction of the guide means 52. It is also conceivable to have each guide surface 53 provided with a smaller or greater number of projections 54, are provided with a coating 55, which corresponds to the coating 26 of the first exemplary embodiment. An end surface 56 of the guide means 52 has no coating and also no projections 54. But it is also conceivable to provide here a coating 55 and, if necessary, projections 54 and even grooves. It is likewise conceivable to have the projections 54 run oblique to the longitudinal direction of the guide surfaces 53 or transverse thereto.

A further guide means not shown in the Figures can be provided at least with a weblike texture on its guide surfaces. The guide surfaces would then have criss-crossing strands, which preferably run longitudinally and transverse to the guide surfaces. The cross-sections of the strands may be of arbitrary shape, as in the case of the cross-sections of the projections 54 and grooves 50. It is likewise conceivable to provide the strands with a coating.

The conveyer belt 10 is manufactured preferably in two separate processes, in which the traction means 11 and the guide means 12 are first manufactured individually, i.e. separate from each other, and then permanently joined to each other by adhesive bonding, vulcanization, welding or the like.

The traction means 11 can be manufactured in the known manner, preferably according to the known method common to V-belts. The only special step in its manufacture is to provide the traction means 11 with the longitudinal groove 20. However, the longitudinal groove 20 can also be put into the traction means 11 later, for example by means of milling.

According to the invention, a special step is involved in manufacturing the guide means 12, which is partially coated with a material having a reduced friction value. This material is preferably a thermoplastic synthetic, such as polyamide, polypropylene or polytetrafluor ethylene.

The manufacturing process of the guide means 12 takes place between two form wheels 27 and 28. The cylindrical form wheel 27, which is greater in diameter, is provided around its circumference with a key groove 29, whose cross-section corresponds at least to the cross-section of the guide means 12. In the shown exemplary embodiment the entire key groove 29 is trapezoid in shape, with its depth corresponding to the overall height of the guide means 12, preferably somewhat greater. A horizontal ring surface 30 in the base of the key groove 29 corresponds approximately to the width of the end surface 22 of the guide section 21 of the guide means 12. The form wheel 28 having the smaller diameter is provided with a smooth cylindrical shell. The form wheels 27 and 28 lie opposite one another with parallel rotational axes 31 and 32, such that a form gap 33 arises between the two form wheels 27 and 28.

An endless tension belt 34 is guided around part of the circumference of both form wheels 27 and 28. The tension belt 34 is introduced above to the smaller form wheel 28 which lies above the larger form wheel 28. The tension belt 34 then runs along more than half the circumference of the small form wheel 28 to the form gap 33, where it is deflected from the form wheel 28 and led to the larger form wheel 27. The tension belt 34 then runs along more than approximately half of the circumference of the form wheel 27 and is deflected at the underside of the latter to a deflection drum 35, which leads the tension belt 34 to a further deflection drum 36. From this deflection drum 36 the tension strip runs back to the top side of the small form wheel 28.

Provided at a lower region of the large form wheel 27 is a cooling stretch. This is preferably a water bath 37, into which the lower part of the large form wheel 27 is immersed. Deflection drums 35 and 36 are also arranged in the water bath 37.

The production of the guide means 12 is carried out such that the polyamide web 39 is led from a supply reel 38, on which a material strip of the polyamide web 39 used for the coating 26 is rolled up, passed over a deflection roller 40 to the side of the large form wheel 27 not occupied by the tension belt 34, where it is introduced into the key groove 29 by means of a holding-down clamp 41. The holding-down clamp 41 is designed so that the polyamide web 39, whose width has been selected so that it covers at least the entire surface of the key groove 29, is inserted into the key groove 29 so that the polyamide web 39 lies against the ring surfaces 30 and against the oblique tapered surfaces 42 located on the mutually opposing sides of the same. Once the polyamide web 39 has been inserted into the key groove 29 and pressed into it by the holding-down clamp 41, the core material for the formation of the guide means 12, preferably polyurethane; is injected from a spray head 43 with a round-nozzle attachment in a free-flowing state created by heat application, specifically in a sufficient amount to fill the key groove 29 of the form wheel 27.

Due to the uniformly rotating form wheels 27 and 28 and a continuous forward movement of the tension belt 34, the polyamide web 39 and the free-flowing core material for the guide means 12 are conveyed further into the form gap 33. There the small form wheel 28 presses the material into the key groove 29, with excess material landing on the cylindrical surface shell 44 of the form wheel 27. After passing through the form gap 33, the surface shell 44 of the form wheel 27 is covered by the tension belt 34. This allows the polyamide web 39 and the core material for the guide means 12 to be lowered into the water bath 37 still sandwiched between the tension belt 34 and the form wheel 27. In the process, a cooling process, especially that of the core material, takes place for the formation of the guide means 12. After sufficient cooling, the tension belt 34 is deflected from the form wheel 27 and the completed guide means 12 can be led out of the key groove 29 of the form wheel 27. During the formation of the guide means 12 in the key groove 29 of the form wheel 27, the textured outer side of the polyamide web 39 for forming the coating 26 can be smoothed, which leads to a further-reduction of the friction value, above all that of the outer side of the coating 26.

Figure 5:
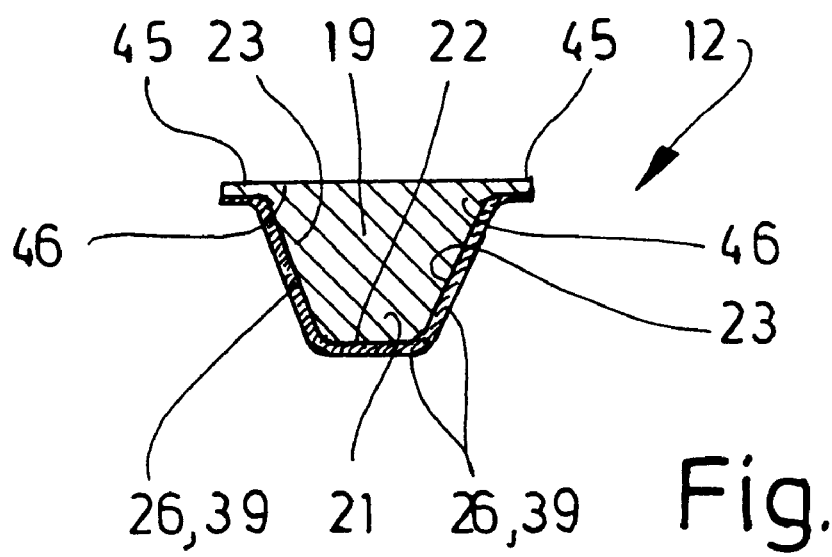

After leaving the key groove 29 in the water bath 37, the guide means 12 has not yet attained its final shape. Instead a narrow residual strip of the core material and the polyamide web 39 overhangs at either side of the broad top side of the guide means 12 (FIG. 5). By means of a subsequent trimming of the opposite edges of the guide means 12, the residual strips 45 and the facing corner regions 46 are cut off, specifically perpendicular to the top side 24 of the guide means 12, resulting in the uncoated, rectangular root section 19 of the guide means 12 (FIG. 6).

The guide means 12 formed in the manner outlined above features an inner connection between the core material made of polyurethane and the polyamide web 39 in that the heated and free-flowing core material applied to the polyamide web 39 permanently bonds with the polyamide web 39. This results in a permanent coating of the opposing oblique guide surfaces 23 and the connecting (narrow) end surfaces 22 of the trapezoid-shaped root section 19 of the guide means 12.

The guide means 12 as produced in the manner described above is then joined to the separately manufactured traction means 11. This can be accomplished by arranging for adjacent and synchronous manufacturing processes for the traction means 11 and the guide means 12, thus making an immediate connection possible after manufacture of the traction means 11 and the guide means 12 by leading them to one another and joining them permanently by means of welding, adhesive bonding and/or vulcanization.

The above detailed description of the preferred embodiments and the appended figures are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. Belt, especially conveyor belt (10), with a traction means (11) and at least one guide means (12) connected thereto, characterized in that the guide means (12) comprises a core material and is provided at least in part with a material with a decreased friction value compared to that of the core material.

2. Belt according to claim 1, characterized in that the reduction of the friction value is achieved with an outer coating (26) of a material having a reduced friction value.

3. Belt according to claim 2, characterized in that the coating (26) extends over at least regions of the guide means (12) which bear on a deflection means of the conveyor belt (10).

4. Belt according to claim 2, characterized in that, except for a region with which the at least one guide means (12) is connected to the traction means (11), the outer surfaces of the guide means (12) are coated with the coating (26).

5. Belt according to claim 2 characterized in that the guide means (12) is configured as a guide key having at least in part a trapezoid-shaped cross-section.

6. Belt according to claim 5, characterized in that at least opposing, obliquely directed guide surfaces (23) of a guide section (21) of the guide means (12) having the trapezoid-shaped cross-section are provided with the coating (26).

7. Belt according to claim 2, characterized in that the coating (26) is designed as a synthetic coating (39), which is bonded to the core material of at least the guide means (12).

8. Belt according to claim 1, characterized in that the coating (26) made of a thermoplastic synthetic is formed with a decreased friction value and the core material made of a thermoplastic synthetic is formed with a greater friction value than the coating (26), with the coating (26) being formed from a web made of thermoplastic synthetic with a lower friction value than the core material.

9. Belt according to claim 1, characterized in that at least guide surfaces (23) of the guide means (12) have a profile.

10. Belt according to claim 9, characterized in that at least the guide surfaces (23) of the guide means (12) have a web-like profile.

11. Belt according to claim 9, characterized in that the coating (26) is also arranged in the profiled regions.

12. Belt according to claim 2, characterized in that the coating (26) made of a thermoplastic synthetic is formed with a decreased friction value and the core material made of a thermoplastic synthetic is formed with a greater friction value than the coating (26), with the coating (26) being formed from a web made of thermoplastic synthetic with a lower friction value than the core material.

* * * * *